US009976221B2

(12) United States Patent
Chiou et al.

(10) Patent No.: US 9,976,221 B2
(45) Date of Patent: May 22, 2018

(54) ELECTROLYTIC TANK APPARATUS (71) Applicant: NATIONAL CHIAO TUNG UNIVERSITY, Hsinchu (TW)

(72) Inventors: Jin-Chern Chiou, Hsinchu (TW); Pao-Yuan Chang, Taipei (TW); Huang-Yuan Chang, Taipei (TW)

(73) Assignee: National Chiao Tung University, Hsinchu (TW)

( * ) Notice: Subject to any disclaimer, the term of this patent is extended or adjusted under 35 U.S.C. 154(b) by 164 days.

(21) Appl. No.: 14/985,192

(22) Filed: Dec. 30, 2015

(65) Prior Publication Data
US 2016/0326660 A1 Nov. 10, 2016

(30) Foreign Application Priority Data

May 7, 2015 (TW) .............................. 104114589 A (51) Int. Cl.
| C25B 15/02 | (2006.01) |
| C25B 9/06 | (2006.01) |
| C25B 1/04 | (2006.01) |
| C25B 15/08 | (2006.01) |

(52) U.S. Cl.
CPC ............... *C25B 15/02* (2013.01); *C25B 1/04* (2013.01); *C25B 9/06* (2013.01); *C25B 15/08* (2013.01); *Y02E 60/366* (2013.01)

(58) Field of Classification Search
CPC .. C25B 1/04; C25B 9/06; C25B 15/02; C25B 15/08; Y02E 60/366
See application file for complete search history.

(56) References Cited

U.S. PATENT DOCUMENTS

2013/0146474 A1* 6/2013 Sullivan ............... C25B 1/26
205/510
2015/0144483 A1* 5/2015 Lin ........................ C25B 15/02
204/274

FOREIGN PATENT DOCUMENTS

| TW | M353851 U | 4/2009 |
| TW | M455767 U1 | 6/2013 |
| TW | I439322 B | 6/2014 |

OTHER PUBLICATIONS

Dragica Lj. Stojic, et al., "Hydrogen generation from water electrolysis—possibilities of energy saving," Journal of Power Sources 118 (2003), pp. 315-319.
Takami Iida, Hisayoshi Matsushima, and Yasuhiro Fukunaka, "Water Electrolysis under a Magnetic Field," Journal of The Electrochemical Society 154 (8) E112-E115 (2007).
(Continued)

*Primary Examiner* — Ciel P Thomas
(74) *Attorney, Agent, or Firm* — Lewis Roca Rothgerber Christie LLP (57) ABSTRACT

An electrolytic tank apparatus includes a tank body and at least one electrode set. The tank body defines an outer tank space for receiving a coolant, and at least one inner tank space that is surrounded by the outer tank space and that is not in fluid communication with the outer tank space. The tank body has a tank wall formed with a coolant inlet and a coolant outlet each communicating with the outer tank space. The electrode set is disposed in the inner tank space and includes at least one cathode plate, at least one anode plate, a cathode-connecting structure that is electrically coupled to the cathode plate, and an anode-connecting structure that is electrically coupled to the anode plate.

12 Claims, 8 Drawing Sheets

(56) References Cited

OTHER PUBLICATIONS

Ming-Yuan Lin, Lih-Wu Hourng, Chan-Wei Kuo, "The effect of magnetic force on hydrogen production efficiency in water electrolysis," International Journal of Hydrogen Energy 37(2012), pp. 1311-1320.

* cited by examiner

ELECTROLYTIC TANK APPARATUS

CROSS-REFERENCE TO RELATED APPLICATION

This application claims priority of Taiwanese Patent Application No. 104114589, filed on May 7, 2015.

FIELD

The disclosure relates to an electrolytic tank apparatus, more particularly to an electrolytic tank apparatus having temperature-controlling function.

BACKGROUND

Oxyhydrogen has long been treated as an important raw material in various fields of industrial application. Recently, oxyhydrogen has been widely adopted for energy-saving and environmental protection purposes as a source of clean energy (for instance, adopted as a fuel for hybrid vehicles). In addition, research has indicated that oxyhydrogen intake can reduce damage caused by free radicals to the human health, and thus water containing oxyhydrogen is now commercially available in the market. In general, oxyhydrogen is generated by electrolyzing water using a conventional electrolytic tank apparatus. However, during the electrolysis reaction, the temperature in the conventional electrolytic tank apparatus may increase due to continued electrical power consumption, and thereby lower the impedance of the conventional electrolytic tank apparatus. As such, the temperature therein is prone to rise even higher, thus lowering the production efficiency of oxyhydrogen.

SUMMARY

Therefore, an object of the disclosure is to provide an electrolytic tank apparatus that can alleviate at least one of the drawbacks of the prior art.

According to the disclosure, an electrolytic tank apparatus may include a tank body and at least one electrode set.

The tank body defines an outer tank space adapted for receiving a coolant, and at least one inner tank space that is surrounded by the outer tank space, that is not in fluid communication with the outer tank space, and that is adapted for receiving an electrolyte solution. The tank body has a tank wall formed with a coolant inlet and a coolant outlet each fluidly communicating with the outer tank space.

The electrode set is disposed in the inner tank space and includes at least one cathode plate, at least one anode plate, a cathode-connecting structure that is electrically coupled to the at least one cathode plate, and an anode-connecting structure that is electrically coupled to the at least one anode plate.

BRIEF DESCRIPTION OF THE DRAWINGS

Other features and advantages of the disclosure will become apparent in the following detailed description of the exemplary embodiment with reference to the accompanying drawings, of which.

DETAILED DESCRIPTION

Referring to FIGS. 1 to 9, an exemplary embodiment of an electrolytic tank apparatus according to the present disclosure is shown to include a tank body 1, a pair of electrode sets 2, a gas transfer system 3, a pair of inner tank covers 4, and an outer tank cover 5.

Figure 1:
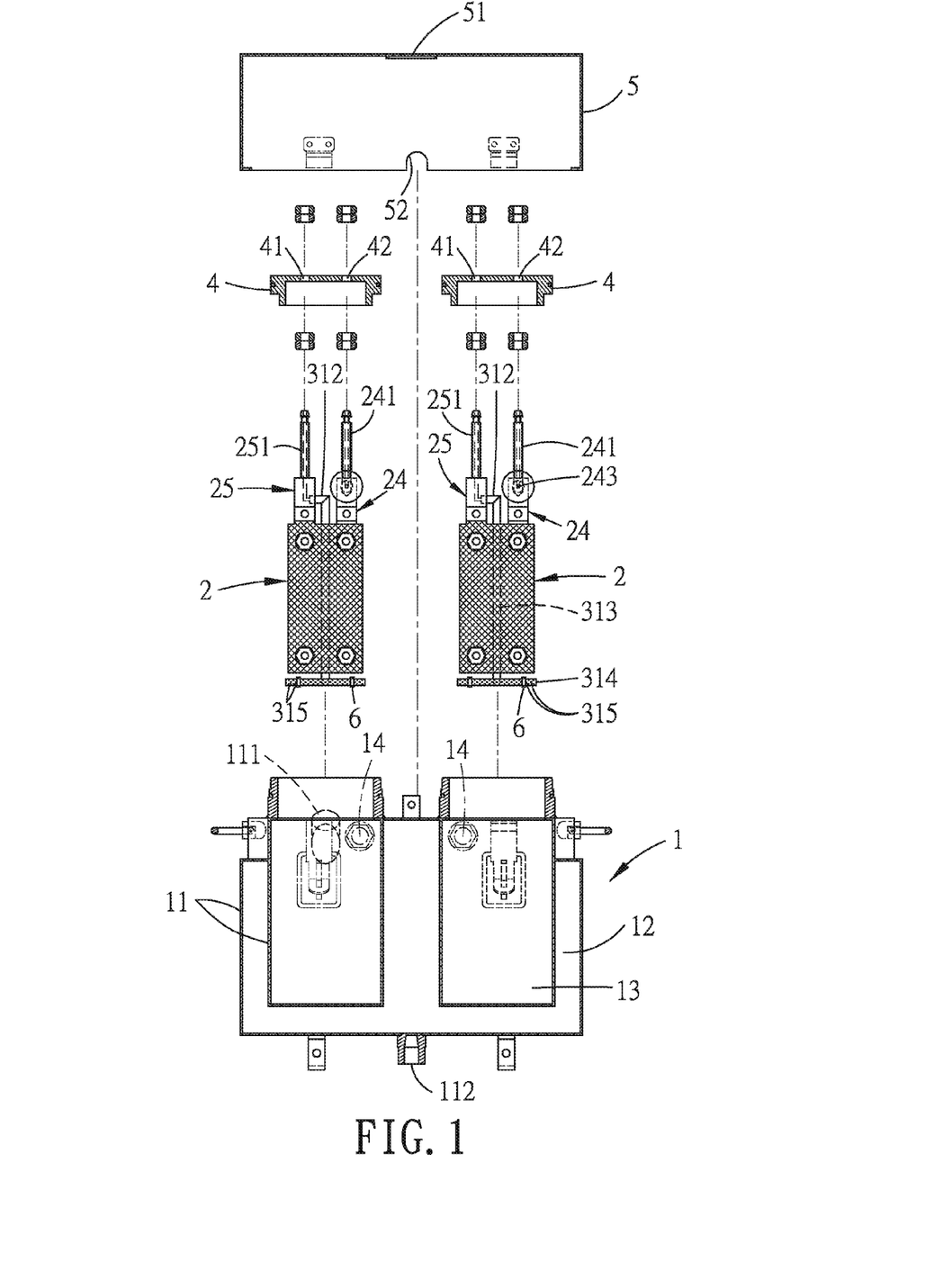
FIG. 1 is an exploded partially-sectional view illustrating an exemplary embodiment of an electrolytic tank apparatus according to the present disclosure.
Figure 2:
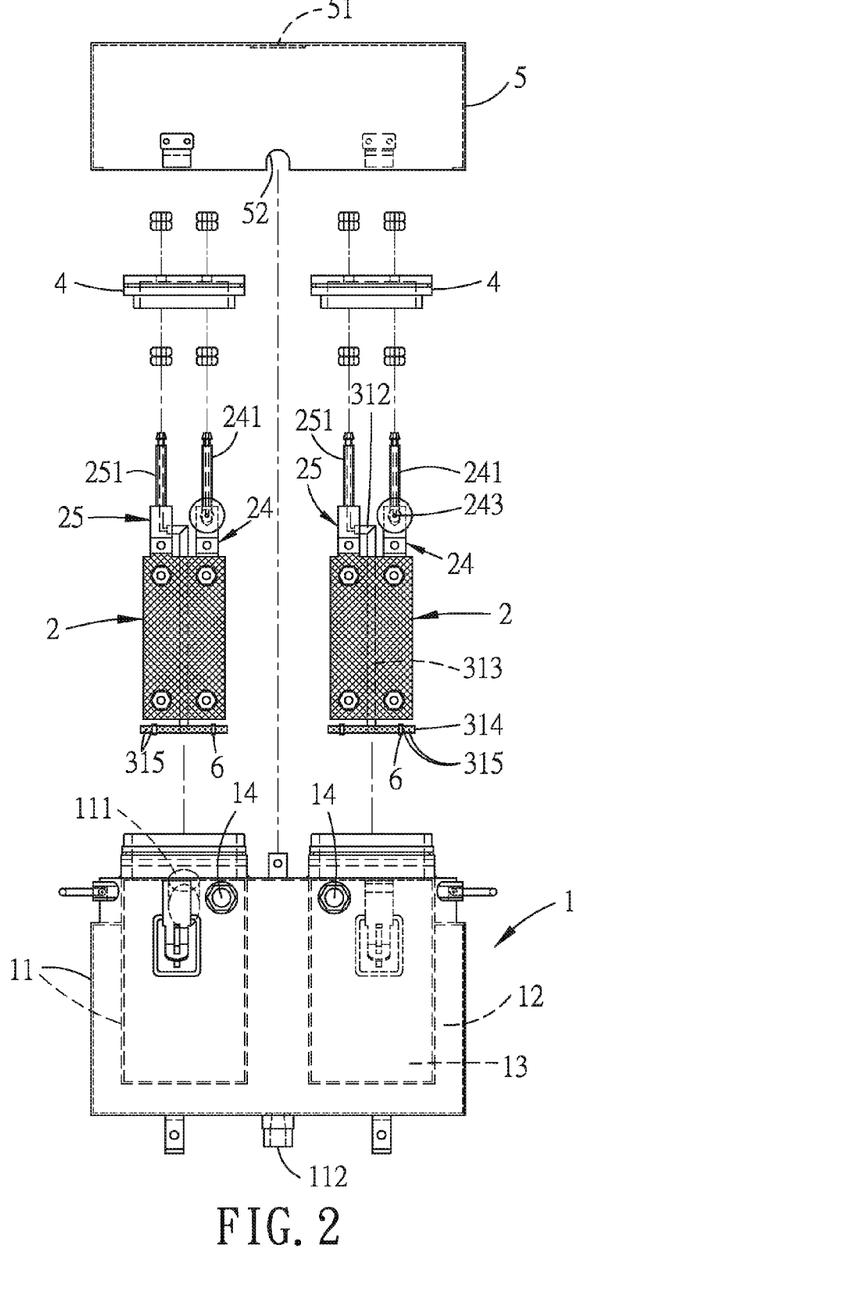
FIG. 2 is an exploded front view of the exemplary embodiment.
Figure 3:
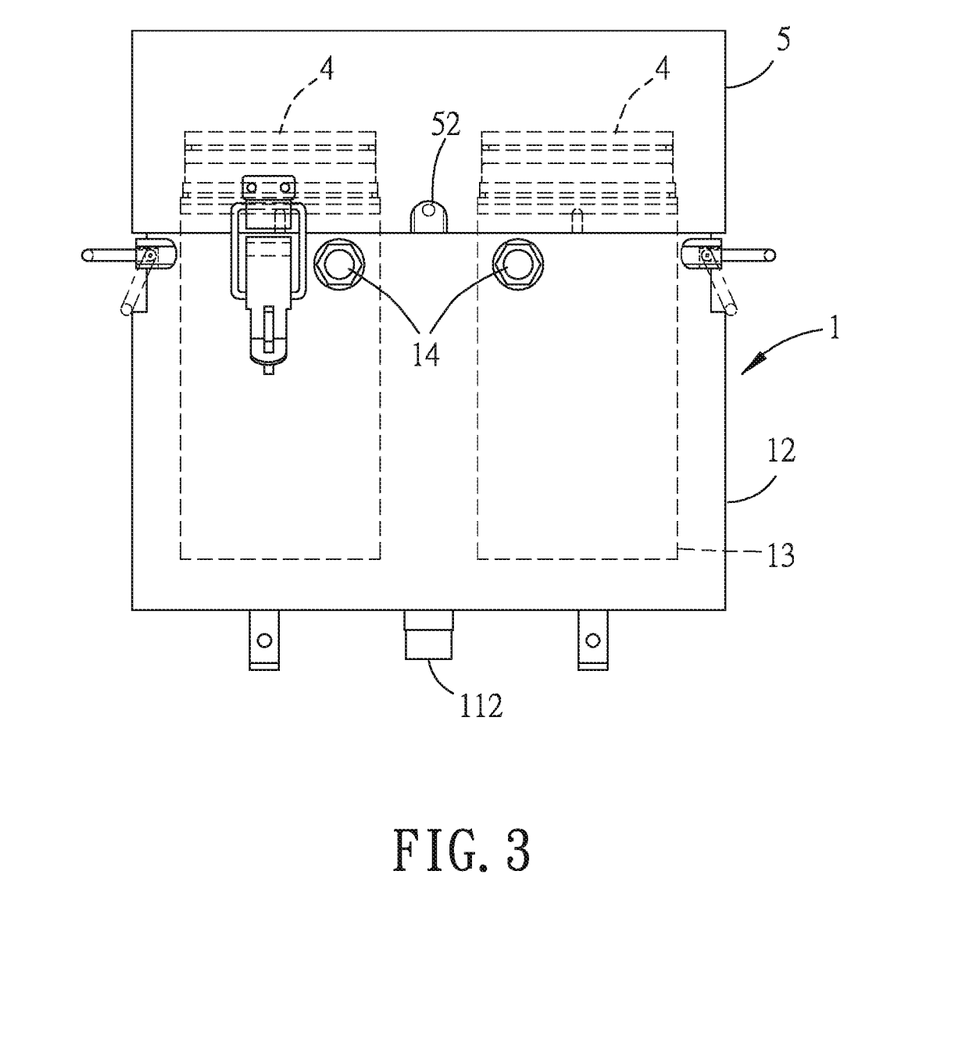
FIG. 3 is a front view of the exemplary embodiment.
Figure 4:
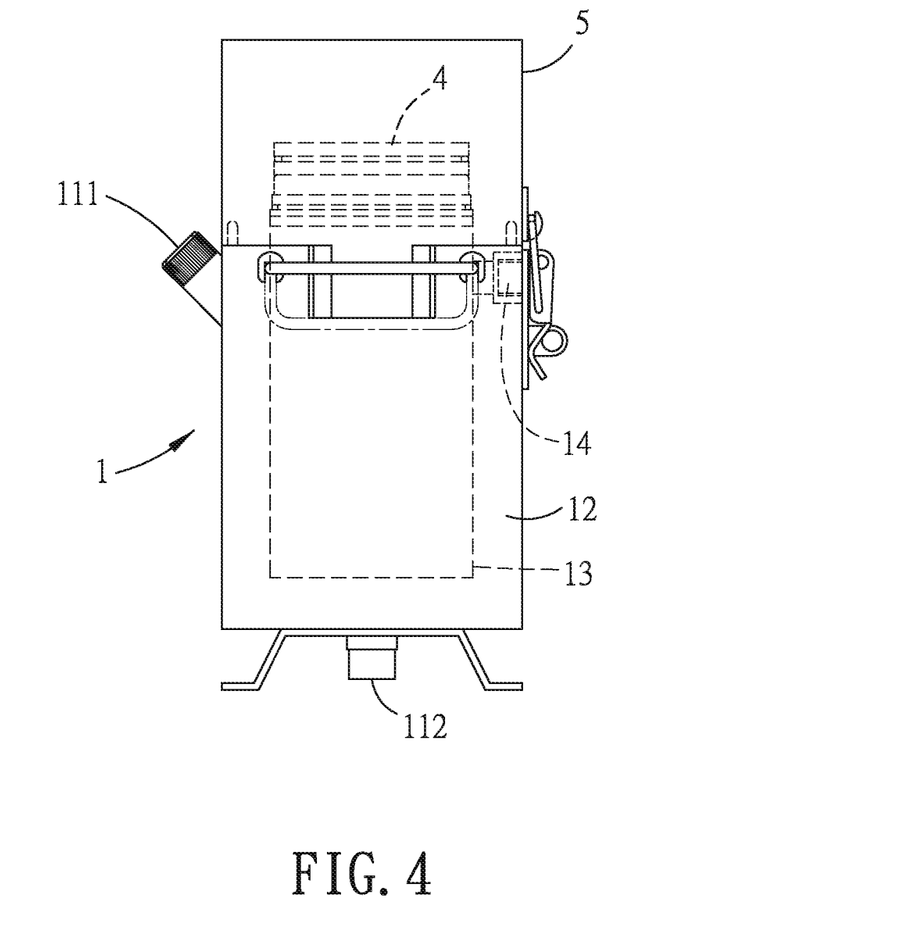
FIG. 4 is a side view of the exemplary embodiment.
Figure 5:
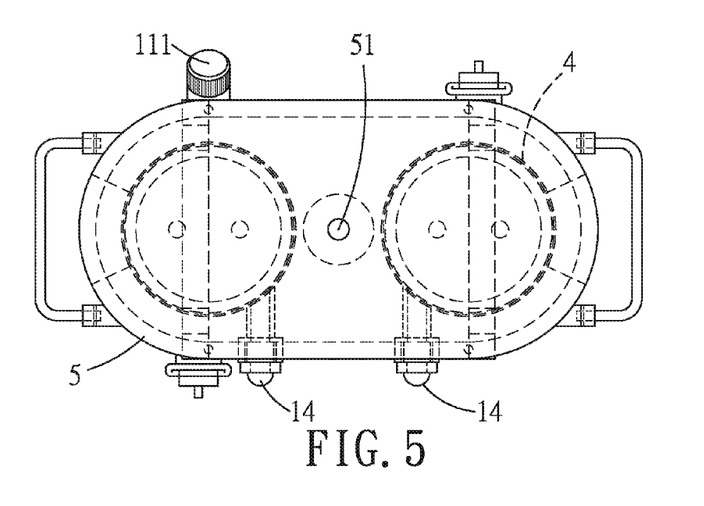
FIG. 5 is a top plan view of the exemplary embodiment.

As shown in FIGS. 1 to 5, the tank body 1 of this embodiment has a tank wall 11 and defines an outer tank space 12 that is adapted for receiving a coolant (not shown), and a pair of inner tank spaces 13 that are surrounded by the outer tank space 12 and that is not in fluid communication with the outer tank space 12. Each of the inner tank spaces 13 receives a respective one of the electrode sets 2 and is adapted for receiving an electrolyte solution (not shown). It is worth noting that the number of the inner tank spaces 13 defined by the tank body 1 is not limited to what is disclosed in this embodiment according to the present disclosure. In other words, the number of the inner tank spaces 13 defined by the tank body 1 is not limited to two. The inclusion of multiple inner tank spaces 13 in the tank body 11 allows an operator to simultaneously perform, as well as to control, multiple electrolysis reactions respectively in the inner tank spaces 13. As such, the amount of oxyhydrogen generated from the electrolytic tank apparatus can be regulated in accordance with various demands. As shown in FIGS. 1, 2 and 4, the tank wall 11 is formed with a coolant inlet 111 and a coolant outlet 112 each fluidly communicating with the outer tank space 12. The coolant flowing in the outer tank space 12 is able to reduce the temperature of the electrolyte solution in the inner tank spaces 13, which may increase when the electrolysis reaction is being performed. As shown in FIGS. 1 and 2, the tank body 1 may further have a plurality of observation holes 14, each being in spatial communication with a respective one of the inner tank spaces 13 to facilitate water-level observation in the inner tank spaces 13.

Figure 6:
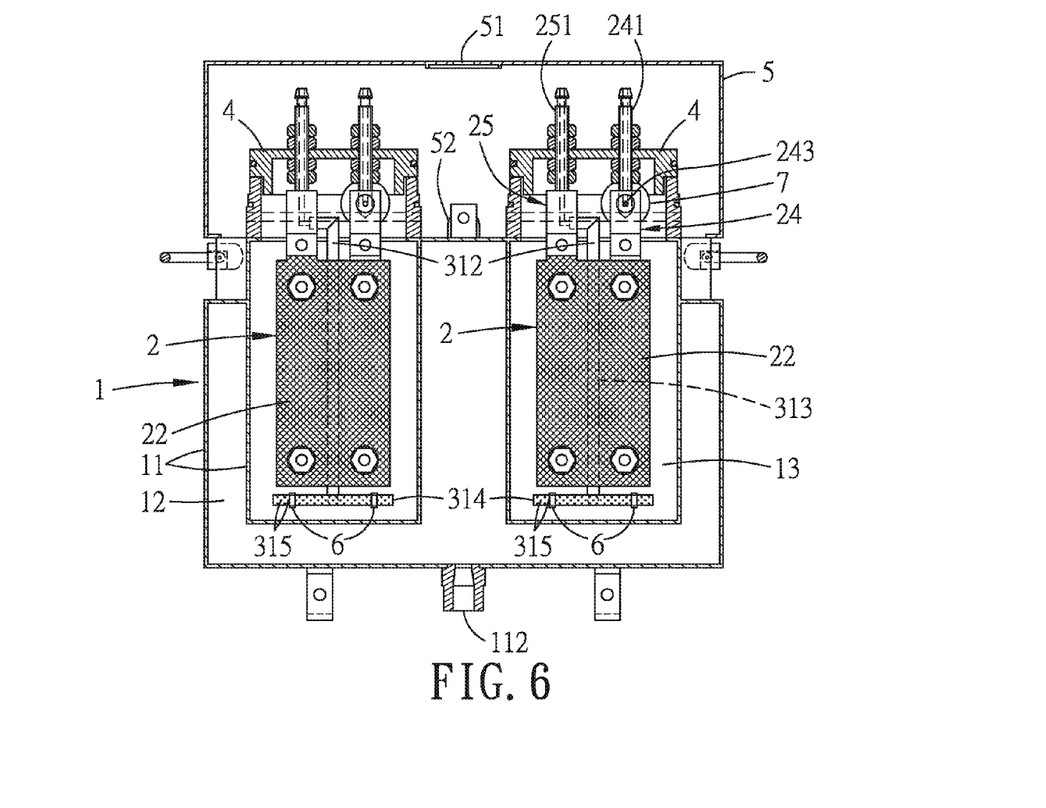
FIG. 6 is a sectional view of the exemplary embodiment.

As shown in FIG. 6, the electrode sets 2 are respectively disposed in the inner tank spaces 13 and, in this embodiment, are operable for performing electrolysis reactions to generate oxyhydrogen. Each of the electrode sets 2 in this embodiment includes a plurality of anode plates 21, a plurality of cathode plates 22, an insulating unit 23, an anode-connecting structure 24 that is electrically coupled to the anode plates 21, and a cathode-connecting structure 25 that is electrically coupled to the cathode plates 22. It should be noted that the anode plates 21 and the cathode plates 22 included in the electrode set 2 are not limited to being multiple in number, i.e., one single anode plate 21 (or cathode plate 22) may also suffice according to the present disclosure. It should also be noted that the number of the electrode sets 2 to be included in the electrolytic tank apparatus is not limited to what is disclosed in this embodiment of the present disclosure, so long as the number of the electrode sets 2 corresponds to the number of the inner tank spaces 13.

Figure 7:
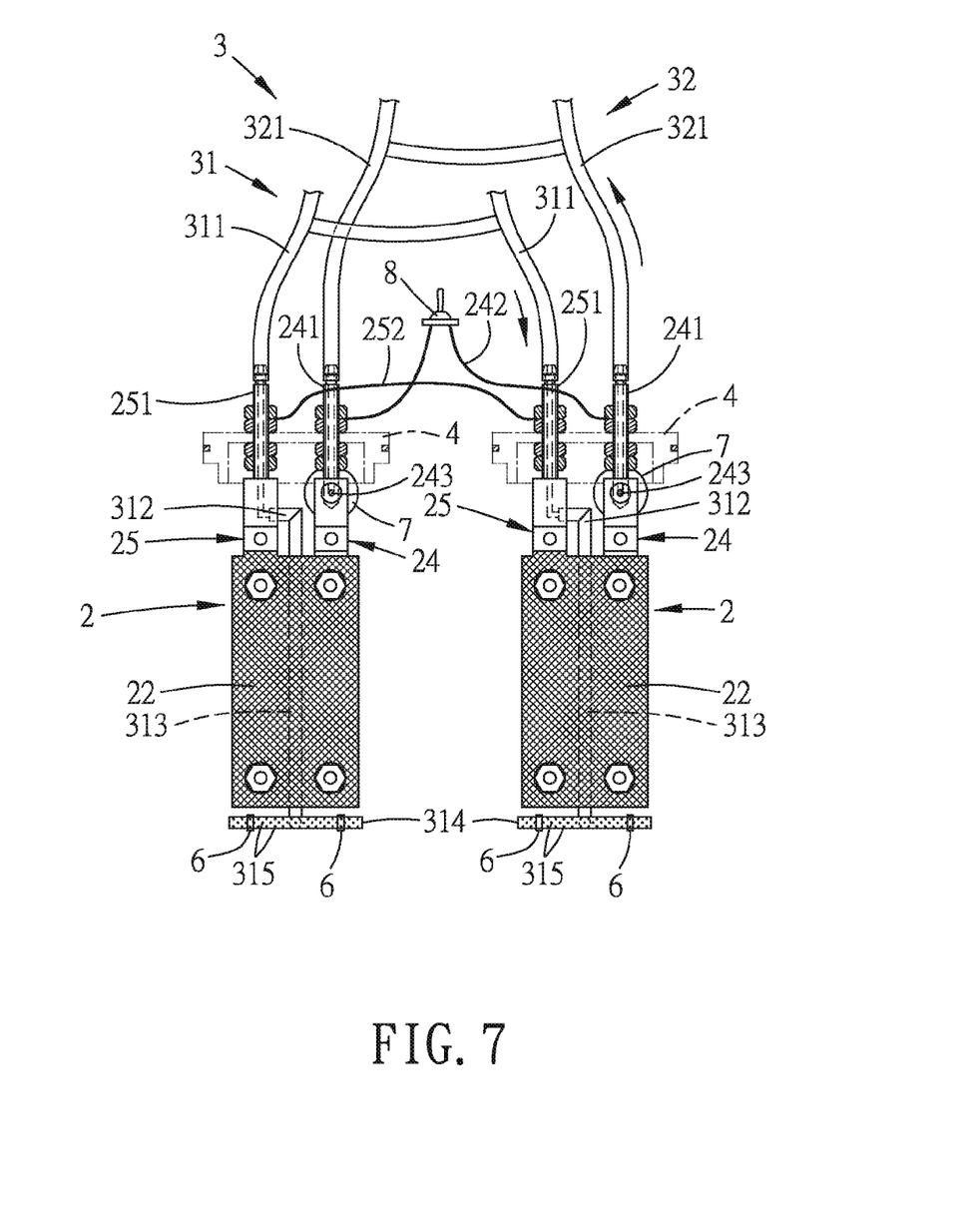
FIG. 7 is a fragmentary side view of the exemplary embodiment, illustrating a gas transfer system and a pair of electrode sets of the electrolytic tank apparatus.
Figure 8:
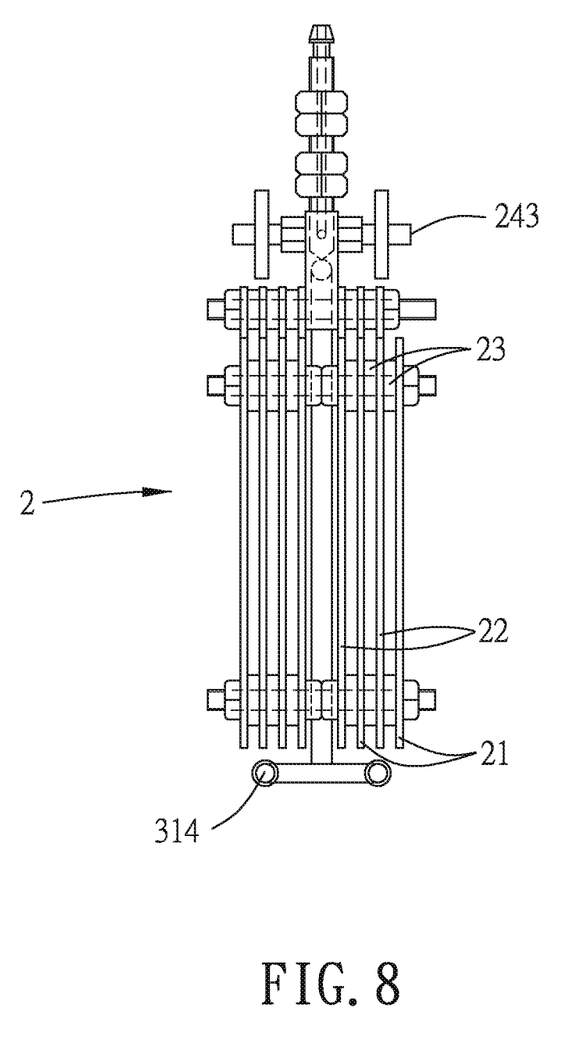
FIG. 8 is a side view of the exemplary embodiment, illustrating an electrode set of the electrolytic tank apparatus.
Figure 9:
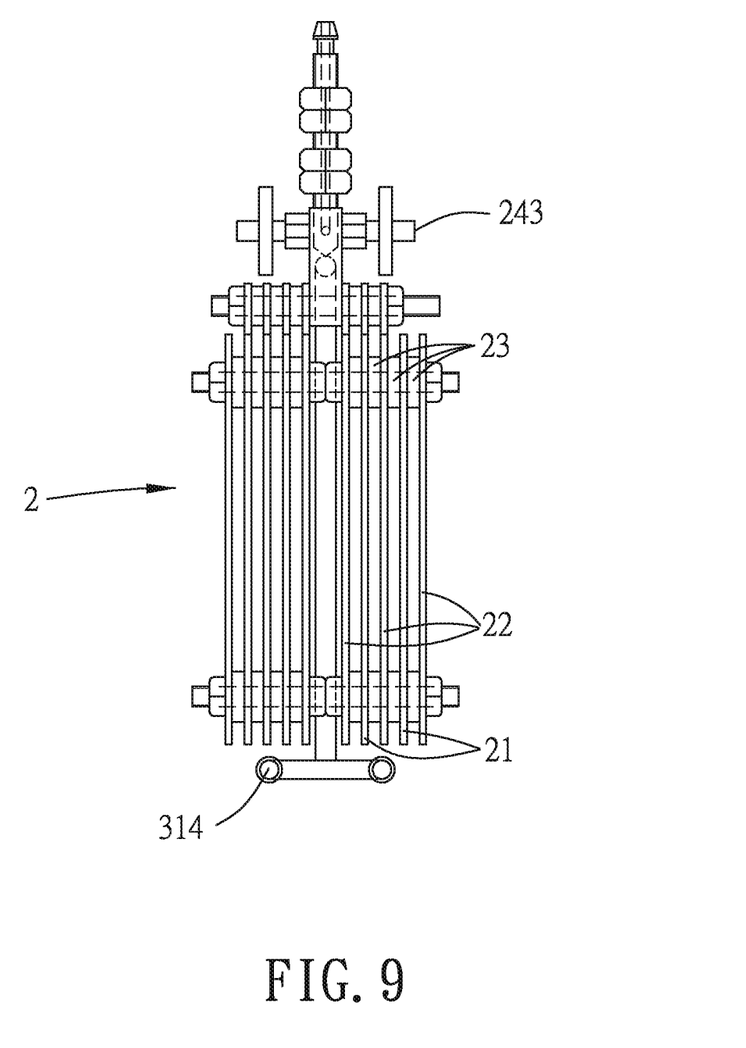
FIG. 9 is a side view of the exemplary embodiment, illustrating a modified electrode set of the electrolytic tank apparatus.

As shown in FIG. 8, the anode plates 21 are alternately stacked with the cathode plates 22 into multiple pairs in a mutually spaced-apart manner. In certain embodiments where the anode plates 21 are more expensive than the cathode plates 22, the anode and cathode plates 21, 22 may be alternately arranged with the leftmost and rightmost ones being the cathode plates 22 as illustrated in FIG. 9, so as to reduce the production cost. In this embodiment, each of the cathode plates 22 and the anode plates 21 is configured to have a network structure for increasing contact area with the electrolyte solution so as to enhance production efficiency of oxyhydrogen. However, the cathode and anode plates 22, 21 may be configured to have different shapes and are not limited to what is disclosed in this embodiment according to the present disclosure. As shown in FIG. 8, the insulating unit 23 is disposed to provide electrical insulation between said cathode plates 22 and said anode plates 21. The anode-connecting structure 24 includes an anode metal tube 241 and an anode-connecting wire 242. The anode metal tube 241 is electrically coupled to the anode plates 21 and is provided with a gas-collecting inlet 243 for collecting gas generated by a corresponding one of the electrode sets 2 in a corresponding one of the inner tank spaces 13 (see FIGS. 6 to 8). The anode-connecting wire 242 is electrically coupled to the anode metal tube 241 and the anode plates 21. The cathode-connecting structure 25 includes a cathode metal tube 251 that is electrically coupled to the cathode plates 22, and a cathode-connecting wire 252 that is electrically coupled to the cathode metal tube 251 and the cathode plates 22. The cathode-connecting wire 252 and the anode-connecting wire 251 are used for providing electrical power to the corresponding one of the electrode sets 2 so as to induce electrolysis reaction in the corresponding one of the inner tank spaces 13. It should be noted that, in this embodiment, the electrolytic tank apparatus may further include a power switch 8 electrically coupled to the electrode sets 2 for simultaneously controlling either one or more of the electrode sets 2 to perform the electrolysis reaction and to adjust the amount of oxyhydrogen generated therefrom.

As shown in FIG. 7, the gas transfer system 3 includes a gas-introducing device 31 and a gas-collecting device 32. The gas-introducing device 31 of this embodiment includes a pair of gas-introducing tubes 311 each of which is connected to and in air communication with the cathode metal tube 251 of the corresponding one of the electrode sets 2 for introducing gas thereinto, and a pair of pipe members 312 each of which is connected to and in air communication with the cathode metal tube 251 of the corresponding one of the electrode sets 2. As shown in FIG. 7, each of the pipe members 312 has a vertical segment 313 extending downwardly form the cathode metal tube 251, and a horizontal segment 314 that is connected to the vertical segment 313, that is disposed under the cathode plates 22, and that is formed with a plurality of vent holes 315. As such, the gas introduced from the gas-introducing tube 311 can be delivered into the inner tank space 13 through the vent holes 315 of the horizontal segment 314. In this embodiment, the electrolytic tank apparatus may further include a plurality of spacers 6 each being provided on the horizontal segment 314 of each of the pipe members 312 for separating the horizontal segment 314 from the tank wall 11. The gas-collecting device 32 has a pair of gas-collecting tubes 321 each of which is connected to and in air communication with the anode metal tube 241 of the corresponding one of the electrode sets 2 for collecting the gas generated by the corresponding one of the electrode sets 2. It should be noted that the numbers of the gas-introducing tubes 311, of the pipe members 312, and of the gas-collecting tubes 321 are not limited to what is disclosed in this embodiment according to the present disclosure, so long as such numbers correspond to the number of the electrode sets 2.

When using the electrolytic tank apparatus of the present disclosure to generate oxyhydrogen, an insoluble gas may first be introduced from the gas-introducing tubes 311 into the pipe members 312 via the cathode metal tubes 251. The insoluble gas may then be delivered into the inner tank spaces 13 through the vent holes 315 on the horizontal segments 314 of the pipe members 312. In the meantime, the power switch 8 may be switched on to provide electrical power to the electrode sets 2 for initiating the electrolysis reaction in the inner tank space(s) 13, so as to generate oxyhydrogen. Since the gas introduced from the gas-introducing tubes 311 is insoluble in the electrolyte solution, such insoluble gas may be in the form of bubbles and flow upwardly to drive oxyhydrogen generated in the inner tank space 13 to move toward the anode metal tube 243. Subsequently, the oxyhydrogen flows through the gas-collecting inlet 243 and the anode metal tubes 241, and is collected by the gas-collecting tubes 311. The collected oxyhydrogen can be used for cleaning carbon deposition in a gas cylinder, or for producing hydrogen-rich water. In this embodiment, the electrolytic tank apparatus may further include a condensation-enhancing net-shaped member 7 provided at the gas-collecting inlet 243 of the anode metal tubes 241 for preventing condensation of water in the anode metal tubes 241, as well as in the gas-collecting device 32.

As shown in FIG. 1, the inner tank covers 4 are for covering respectively the inner tank spaces 13, each being formed with a first through hole 41 for passage of the cathode metal tube 251 of the cathode-connecting structure 25 of a corresponding one of the electrode units 2, and a second through hole 42 for passage of the anode metal tube 241 of the anode-connecting structure 24 of the corresponding one of the electrode sets 2. It is worth noting that since the gas-inducing tube 311 and the gas-collecting tube 321 are correspondingly connected to the anode-connecting structure 24 (i.e., the anode metal tube 241) and the cathode-connecting structure 25 (i.e., the cathode metal tube 251), there is no need for additional through holes in the inner tank cover 4 of the gas-collecting tube 311 and the gas-introducing tube 321. As such, the structural strength of the same can be effectively enhanced. The outer tank cover 5 is for covering the outer tank space 12 and is formed with a first through hole 51 for passage of the power switch 8, and a second through hole 52 for passage of the gas-collecting tube 321 and the gas-introducing tube 311 of the gas transfer system.

To sum up, owing to the configuration of the tank body 1 defining the outer tank space 12 which is adapted for receiving the coolant, the electrolysis reaction in the inner tank spaces 13 of the electrolytic tank apparatus can be performed and maintained at a relatively low temperature, so that the aforementioned drawback of the prior art can be prevented.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electrolytic tank apparatus, comprising:
a tank body defining an outer tank space adapted for receiving a coolant, and at least one inner tank space that is surrounded by said outer tank space, that is not in fluid communication with said outer tank space and that is adapted for receiving an electrolyte solution, said tank body having a tank wall formed with a coolant inlet and a coolant outlet each fluidly communicating with said outer tank space; and
at least one electrode set disposed in said at least one inner tank space and including at least one cathode plate, at least one anode plate, a cathode-connecting structure that is electrically coupled to said at least one cathode plate, and an anode-connecting structure that is electrically coupled to said at least one anode plate;
wherein said cathode-connecting structure includes a cathode metal tube that is electrically coupled to said at least one cathode plate, said electrolytic tank apparatus further comprising a gas transfer system including a gas-introducing device having
a gas-introducing tube that is connected to and in air communication with said cathode metal tube for introducing gas thereinto, and
a pipe member that is connected to and in air communication with said cathode metal tube and that has a vertical segment extending downwardly from said cathode metal tube, and a horizontal segment that is connected to said vertical segment, that is disposed under said at least one cathode plate and that is formed with a plurality of vent holes, so that the gas introduced from said gas-introducing tube can be delivered into said at least one inner tank space therethrough.

2. The electrolytic tank apparatus according to claim 1, wherein said tank body defines a plurality of said at least one inner tank space, said electrolytic tank apparatus further comprising a plurality of said at least one electrode set respectively disposed in said plurality of inner tank spaces.

3. The electrolytic tank apparatus according to claim 2, further comprising a power switch electrically coupled to said plurality of electrode sets.

4. The electrolytic tank apparatus according to claim 2, wherein each of said plurality of electrode sets includes:
a plurality of said at least one cathode plate;
a plurality of said at least one anode plate alternately stacked with said plurality of cathode plates in a mutually spaced-apart manner; and
an insulating unit that is disposed to provide electrical insulation between said plurality of cathode plates and said plurality of anode plates.

5. The electrolytic tank apparatus according to claim 4, wherein each of said plurality of cathode plates and said plurality of anode plates is configured to have a network structure.

6. The electrolytic tank apparatus according to claim 1, wherein:
said anode-connecting structure includes an anode metal tube that is electrically coupled to said at least one anode plate and that is provided with a gas-collecting inlet for collecting gas generated by said at least one electrode set in said at least one inner tank space; and
said gas transfer system further includes a gas-collecting device having a gas-collecting tube that is connected to and in air communication with said anode metal tube for collecting gas generated by said at least one electrode set in said at least one inner tank space.

7. The electrolytic tank apparatus according to claim 1, further comprising a plurality of spacers each being provided on said horizontal segment of said pipe member for separating said horizontal segment from said tank wall.

8. The electrolytic tank apparatus according to claim 6, wherein the gas transfer system further includes a condensation-enhancing net-shaped member provided at said gas-collecting inlet of said anode metal tube.

9. The electrolytic tank apparatus according to claim 1, wherein said tank body further has an observation hole that is in spatial communication with said at least one inner tank space.

10. The electrolytic tank apparatus according to claim 6, further comprising an inner tank cover that is for covering said at least one inner tank space and that is formed with a first through hole for passage of said cathode metal tube of said cathode-connecting structure, and a second through hole for passage of said anode metal tube of said anode-connecting structure.

11. The electrolytic tank apparatus according to claim 3, further comprising an outer tank cover that is for covering said outer tank space and that is formed with a through hole for passage of said power switch.

12. The electrolytic tank apparatus according to claim 6, further comprising an outer tank cover that is for covering said outer tank space and that is formed with a through hole for passage of said gas-collecting tube and said gas-introducing tube.

* * * * *